US010108366B2

(12) United States Patent
Huang et al.

(10) Patent No.: US 10,108,366 B2
(45) Date of Patent: Oct. 23, 2018

(54) NON-VOLATILE MEMORY APPARATUS AND OPERATING METHOD THEREOF

(71) Applicant: VIA Technologies, Inc., New Taipei (TW)

(72) Inventors: Sheng-Huei Huang, New Taipei (TW); Yi-Lin Lai, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 120 days.

(21) Appl. No.: 15/166,268

(22) Filed: May 27, 2016

(65) Prior Publication Data
US 2017/0277471 A1 Sep. 28, 2017

(30) Foreign Application Priority Data

Mar. 22, 2016 (TW) .............................. 105108740 A (51) Int. Cl.
*G06F 11/00* (2006.01)
*G06F 3/06* (2006.01)
(Continued)

(52) U.S. Cl.
CPC ............ *G06F 3/0647* (2013.01); *G06F 3/064* (2013.01); *G06F 3/0616* (2013.01);
(Continued)

(58) Field of Classification Search
CPC ...... G06F 3/0616–3/0619; G06F 3/064; G06F 3/0647; G06F 3/0652; G06F 3/0653; G06F 11/0727; G06F 11/076; G06F 11/0793
See application file for complete search history.

(56) References Cited

U.S. PATENT DOCUMENTS 6,539,503 B1 3/2003 Walker
7,818,525 B1 * 10/2010 Frost .................. G06F 12/0246
365/185.25
(Continued)

FOREIGN PATENT DOCUMENTS

CN 103870399 6/2014
CN 104714896 6/2015
(Continued)

OTHER PUBLICATIONS

"Office Action of Taiwan Counterpart Application," dated Mar. 9, 2017, p. 1-p. 8.
(Continued)

*Primary Examiner* — Michael Maskulinski
(74) *Attorney, Agent, or Firm* — JCIPRNET (57) ABSTRACT

A non-volatile memory apparatus including a non-volatile storage circuit, a main memory and a controller, and an operating method thereof are provided. Each of a plurality of logical block address groups includes a plurality of logical block addresses. Each of the logical block address groups is assigned a group read-count value. An adjustment of the group read-count values is triggered by a read command of a host. When one read-count value of the group read-count values exceeds a preset range, the controller performs a scan operation to non-volatile storage blocks of the non-volatile storage circuit corresponding to a corresponding logical block address group of the read-count value, so as to check a number of error bits. The controller decides whether to perform a storage block data-moving operation to the non-volatile storage block corresponding to the corresponding logical block address group based on results of the scan operation.

32 Claims, 4 Drawing Sheets

(51) Int. Cl.
*G06F 11/07* (2006.01)
*G06F 12/1009* (2016.01)

(52) U.S. Cl.
CPC .......... *G06F 3/0619* (2013.01); *G06F 3/0679* (2013.01); *G06F 3/0685* (2013.01); *G06F 11/076* (2013.01); *G06F 11/079* (2013.01); *G06F 11/0727* (2013.01); *G06F 11/0793* (2013.01); *G06F 12/1009* (2013.01); *G06F 3/0653* (2013.01); *G06F 2212/2022* (2013.01); *G06F 2212/7201* (2013.01)

(56) References Cited

U.S. PATENT DOCUMENTS

| | | | |
|---|---|---|---|
| 7,937,521 B2* | 5/2011 | Reid | G06F 12/0246 365/185.11 |
| 2004/0210708 A1 | 10/2004 | Conley | |
| 2008/0288814 A1* | 11/2008 | Kitahara | G06F 11/073 714/5.1 |
| 2011/0238890 A1 | 9/2011 | Sukegawa | |
| 2012/0059978 A1 | 3/2012 | Rosenband et al. | |
| 2014/0223079 A1 | 8/2014 | Zhang et al. | |
| 2015/0169240 A1* | 6/2015 | Saito | G06F 3/0619 711/162 |
| 2016/0026394 A1* | 1/2016 | Goto | G06F 3/0652 711/103 |
| 2017/0091006 A1* | 3/2017 | Camp | G06F 11/076 |
| 2017/0161135 A1* | 6/2017 | Yen | G06F 11/0727 |

FOREIGN PATENT DOCUMENTS

| | | |
|---|---|---|
| CN | 105022695 | 11/2015 |
| CN | 105320464 | 2/2016 |
| TW | 201243593 | 11/2012 |
| TW | 201608475 | 3/2016 |
| TW | I525631 | 3/2016 |
| TW | I527037 | 3/2016 |

OTHER PUBLICATIONS

"Notice of Allowance of Related U.S. Appl. No. 15/166,272", dated Mar. 29, 2017, p. 1-p. 7.
"Office Action of China Counterpart Application," dated Jun. 1, 2018, p. 1-p. 8.

* cited by examiner

NON-VOLATILE MEMORY APPARATUS AND OPERATING METHOD THEREOF

CROSS-REFERENCE TO RELATED APPLICATION

This application claims the priority benefit of Taiwan application serial no. 105108740, filed on Mar. 22, 2016. The entirety of the above-mentioned patent application is hereby incorporated by reference herein and made a part of this specification.

BACKGROUND OF THE INVENTION

1. Field of the Invention

The invention relates to a memory apparatus, and more particularly, to a non-volatile memory apparatus and an operating method thereof.

2. Description of Related Art

Generally, during operation of a SSD (solid state disk/drive) or a memory disk, a mapping table is required for recording a mapping relation (conversion relation) between a logical address and a physical address. The logical address may include a logical block address (LBA) and/or a logical page address, and the physical address may include a physical block address (PBA) and/or a physical page address. A host usually accesses data stored in the SSD or the memory disk based on a variety of modes including Page Mapping, Block Mapping, Replacement Block or Log Block. Although contents stored by the mapping table corresponding to different modes may be different from one another, when an access command is received by the SSD or the memory disk from the host, the SSD or the memory disk must convert the logical address of the access command into the physical address of a flash memory in the SSD or the memory disk according to the mapping table, and then execute the access command to a physical memory (a physical block or a physical page) pointed by the physical address obtained after the conversion.

During the process of constantly executing the access commands of the host, a corresponding relation between the logical address and the physical address may be changed correspondingly, and thus the content of the mapping table may also be constantly updated. The mapping table is usually stored in a DRAM (dynamic random access memory) in order to accelerate an access speed. When the SSD or the memory disk performs a power-off procedure, the mapping table is kept in the flash memory in the SSD or the memory disk to ensure that the content of the mapping table is not lost due to the power-off procedure. When the SSD or the memory disk is powered on, the SSD performs an initialization procedure. In the initialization procedure, the SSD or the memory disk may read the mapping table from the flash memory and writes the mapping table back to the DRAM.

In general, when one specific memory cell of the flash memory is read, a method for reading the flash memory may result in an undesirable change in bit data of other memory cells near the specific memory cell of the same block. This undesirable change is the so-called "data read disturbance". With respect to one physical page of the flash memory, after performing a read operation to that physical page multiple times, a number of error bits in that physical page increases with increases in usage time (or increases in a read-count). Normally, the flash memory is configured with an ECC (Error Checking and Correcting) mechanism. When the number of error bits per unit bit (e.g., 1K Byte, or a number of bits in one physical page) in the data is less than one specific tolerable number, the ECC mechanism is able to correct the error bits so the flash memory may provide correct data to the host. When the number of error bits per unit bit in the data is greater than the specific tolerable number, the ECC mechanism is unable to correct the error bits. Excessive number of error bits which are uncorrectable by the ECC mechanism will result in data loss.

SUMMARY OF THE INVENTION

The invention is directed to a non-volatile memory apparatus and an operating method thereof, which are capable of flexibly deciding the timing for a scan operation and dynamically deciding whether to perform a storage block data-moving operation based on results of the scan operation in order to prevent data loss.

A non-volatile memory apparatus including a non-volatile storage circuit, a main memory and a controller is provided according to embodiments of the invention. The non-volatile storage circuit has a plurality of non-volatile storage blocks addressed by a plurality of physical block addresses. The main memory is configured to store a mapping table. The mapping table is configured to record a conversion relation between a plurality of logical block addresses and the physical block addresses. The controller is coupled to the main memory and the non-volatile storage circuit. The controller groups the logical block addresses into a plurality of logical block address groups. Each of the logical block address groups includes a plurality of logical block addresses. Each of the logical block address groups is assigned one group read-count value. An adjustment of the group read-count values is triggered by a read command of a host. When one read-count value of the group read-count values exceeds a preset range, the controller performs a scan operation to the non-volatile storage blocks corresponding to the logical block addresses of a corresponding logical block address group corresponding to the read-count value, so as to check a number of error bits. The controller decides whether to perform a storage block data-moving operation to one storage block of the non-volatile storage blocks corresponding to the logical block addresses of the corresponding logical block address group based on results of the scan operation.

An operating method of a non-volatile memory apparatus is provided according to embodiments of the invention. The operating method includes: configuring a non-volatile storage circuit, wherein the non-volatile storage circuit includes a plurality of non-volatile storage blocks addressed by a plurality of physical block addresses; configuring a main memory for storing a mapping table, wherein the mapping table is configured to record a conversion relation between a plurality of logical block addresses and the physical block addresses; grouping the logical block addresses into a plurality of logical block address groups by a controller, wherein each of the logical block address groups includes a plurality of logical block addresses. Each of the logical block address groups is assigned one group read-count value; triggering an adjustment of the group read-count values according to a read command of a host; when one read-count value of the group read-count values exceeds a preset range, performing a scan operation to the non-volatile storage blocks corresponding to the logical block addresses of a corresponding logical block address group corresponding to the read-count value by the controller, so as to check a number of error bits; and deciding whether to perform a storage block data-moving operation to one storage block of the non-volatile storage blocks corresponding to the logical block addresses of the corresponding logical block address group by the controller based on results of the scan operation.

Based on the above, the non-volatile memory apparatus and the operating method thereof as described in the embodiments of the invention are capable of recording the group read-count values corresponding to the logical block address groups respectively. The controller may flexibly decide the timing for the scan operation according to the group read-count values. Based on the results of the scan operation, the controller may dynamically decide whether to perform the storage block data-moving operation in order to prevent data loss.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". Moreover, wherever appropriate in the drawings and embodiments, elements/components/steps with the same reference numerals represent the same or similar parts. Elements/components/steps with the same reference numerals or names in different embodiments may be cross-referenced.

Figure 1:
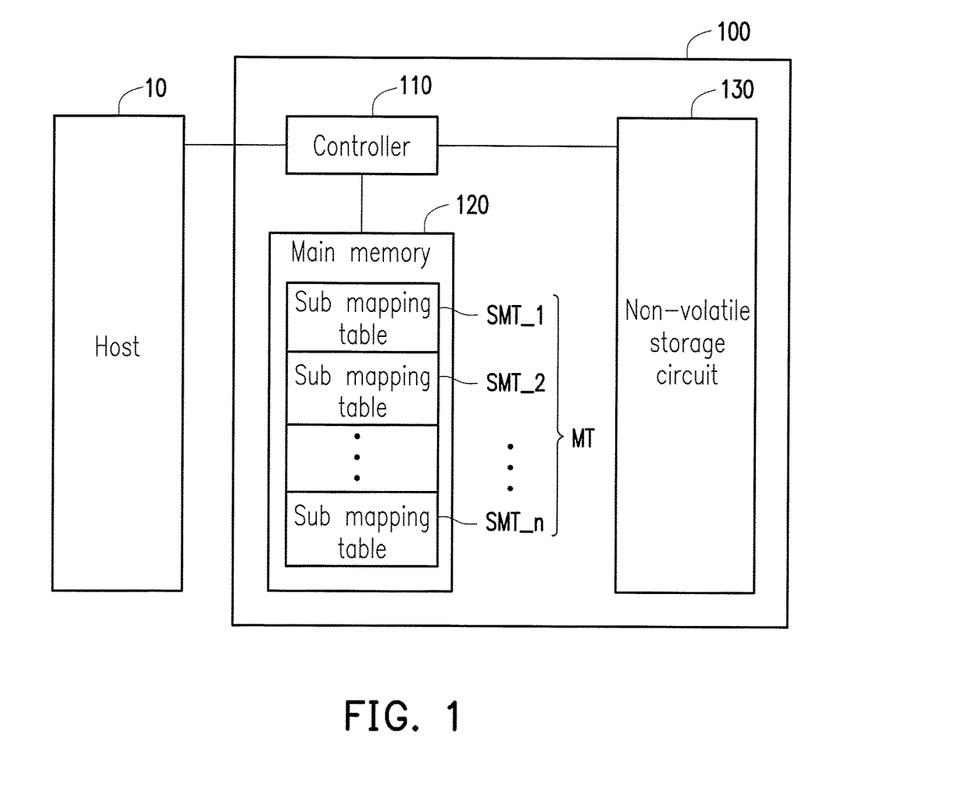
FIG. 1 is a block diagram illustrating circuitry of a non-volatile memory apparatus according to embodiments of the invention.

FIG. 1 is a block diagram illustrating circuitry of a non-volatile memory (NVM) apparatus 100 according to embodiments of the invention. The non-volatile memory apparatus 100 is coupled to a host 10. Examples of the non-volatile memory apparatus 100 include a PCMCIA (Personal Computer Memory Card International Association) card, a CF (compact flash) card, a smart media card (SM, SMC), a memory stick, a multimedia card (MMC, RS-MMC, MMC-micro), a security card (SD, miniSD, microSD, SDHC), a UFS (universal flash storage) device, a SSD (solid state disk/drive) and the like. Based on different application scenarios, the non-volatile memory apparatus 100 may store audio, image and/or video data.

Examples of the host 10 include a computer, a handheld electronic apparatus or other electronic apparatuses. For example, the host 10 may be a personal computer, a hand-held computer, a PDA (personal digital assistant), a PMP (portable media player), a MP3 player, a smart phone, a digital camera, a camcorder, a recorder, a game console, a fax machine, a scanner, a printer and the like.

The host 10 and the non-volatile memory apparatus 100 may be effectively connected to each other by utilizing any one of standard interfaces. For example, said standard interfaces include SCSI (small computer system interface), SAS (Serial Attached SCSI) interface, ESDI (Enhanced Small Disk Interface), SATA (serial advanced technology attachment) interface, PCI-express (peripheral component interconnect express) interface, IDE (integrated drive electronics) interface, USB (universal serial bus) interface, Thunderbolt interface or other interfaces. The invention is not intended to limit structure of the interface between the host 10 and the non-volatile memory apparatus 100.

The non-volatile memory apparatus 100 includes a controller 110, a main memory 120 and a non-volatile storage circuit 130. The controller 110 is coupled to the host 10 through said standard interface. The controller 110 is coupled to the main memory 120 and the non-volatile storage circuit 130. Examples of the main memory 120 include a DRAM (dynamic random access memory), a SRAM (static random access memory) or other volatile memories. For instance, the non-volatile storage circuit 130 is a flash memory. The non-volatile storage circuit 130 has a plurality of non-volatile storage blocks addressed by a plurality of physical block addresses. The main memory 120 has a mapping table MT. The mapping table MT is configured to record a conversion relation between a plurality of logical block addresses and the physical block addresses of the non-volatile storage circuit 130. The controller 110 of the non-volatile memory apparatus 100 converts a logical address of an access command (e.g., a "write" command, a "read" command or other commands) of the host 10 into a physical address of the non-volatile storage circuit 130 according to the mapping table MT in the main memory 120.

Under the influence of the data read disturbance, when a read operation is performed to one specific physical page/physical block of the flash memory (the non-volatile storage circuit 130) multiple times, a number of error bits in the specific physical page/physical block increases with increases in usage time (or increases in a read-count). When the number of error bits in one physical page is less than one specific tolerable number, an ECC (Error Checking and Correcting) mechanism is able to correct the error bits so the non-volatile storage circuit 130 may provide correct data to the host 10. When the number of error bits in one physical page is greater than the specific tolerable number, the ECC mechanism is unable to correct the error bits. Excessive number of error bits which are uncorrectable by the ECC mechanism will result in data loss. Accordingly, a mechanism is required to instantly move/copy data of one physical page (or physical block) having the excessive number of error bits to another physical page (or physical block) while the data of physical page is still correctable by the ECC mechanism.

Figure 2:
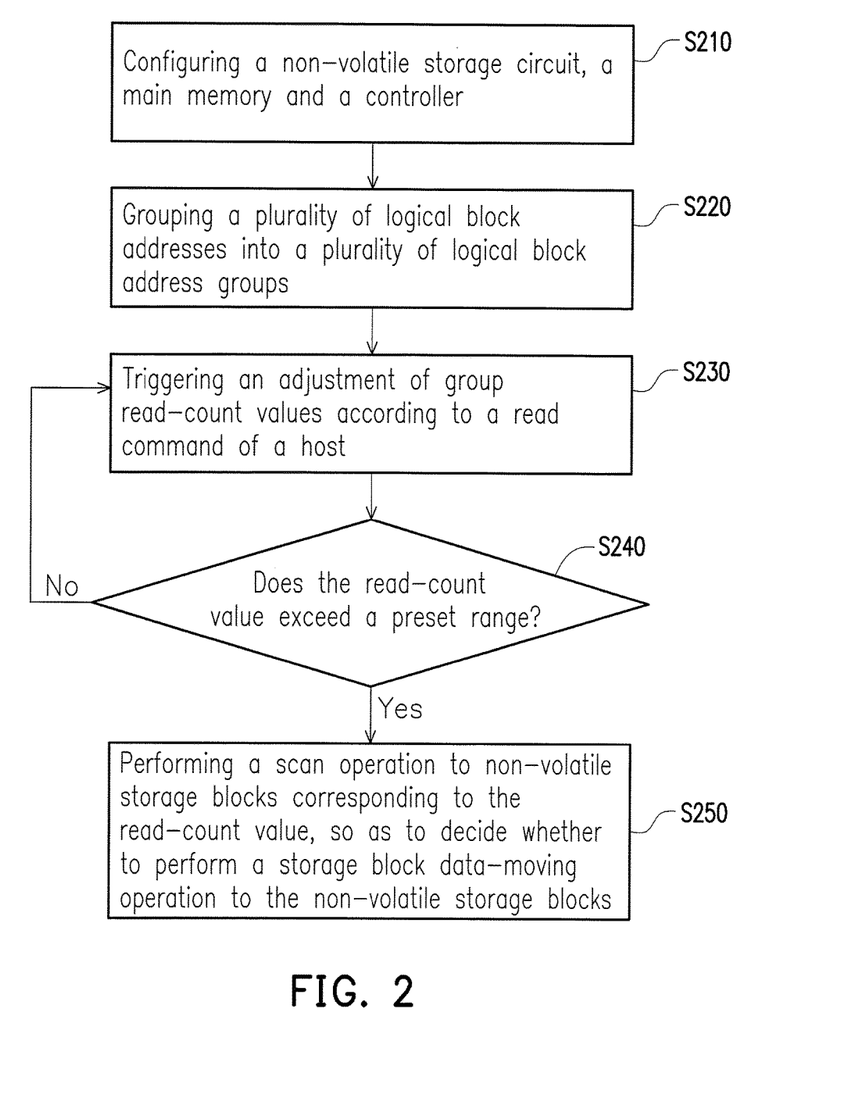
FIG. 2 is a schematic diagram illustrating an operating method of the non-volatile memory apparatus depicted in FIG. 1 according to an embodiment of the invention.

FIG. 2 is a schematic diagram illustrating an operating method of the non-volatile memory apparatus 100 depicted in FIG. 1 according to an embodiment of the invention. Referring to FIG. 1 and FIG. 2, the non-volatile storage circuit 130, the main memory 120 and the controller 110 are configured in the non-volatile memory apparatus 100 in step S210. The controller 110 proceeds to step S220, so as to group a plurality of logical addresses (e.g., the logical block addresses, LBA) at the host end into a plurality of logical block address groups, wherein each of the logical block address groups includes a plurality of logical block addresses. For example, in the case of 10000 logical block addresses, these logical block addresses may be grouped into 400 logical block address groups in step S220, wherein each of the logical block address groups includes 25 logical block addresses. The number of said logical block addresses and the number of the logical block address groups may be decided according to actual design requirements.

The method for grouping as described above may also be decided according to actual design requirements. In some embodiments, the method for grouping the logical block addresses may be performed according to an order of values of the logical block addresses. For example, in the case of each of the logical block address groups having 30 logical block addresses, in step S220, logical block addresses 0 to 29 may be grouped into a logical block address group 0, logical block addresses 30 to 59 may be grouped into a logical block address group 1, and the rest may be deduced by analogy. In some other embodiments, based on consideration of wear-leveling or other considerations, the logical block addresses may be grouped in a discontinuous manner in step S220. For example, in the case of grouping 10000 logical block addresses into 400 logical block address groups so each of the logical block address groups has 25 logical block addresses, in step S220, logical block addresses 0, 400, 800, 1200, 1600, . . . , 9600 may be grouped into a first logical block address group, logical block addresses 1, 401, 801, 1201, 1601, . . . , 9601 may be grouped into a second logical block address group, and the rest may be deduced by analogy. Lastly, logical block addresses 399, 799, 1199, 1599, 1999, . . . , 9999 may be grouped into a 400-th logical block address group. In other embodiments, the logical block addresses may be grouped by using a hash function in step S220.

In some embodiments, the controller 110 may also divide the mapping table MT in the main memory 120 into a plurality of sub mapping tables in step S220, such as n sub mapping tables SMT_1, SMT_2, . . . SMT_n depicted in FIG. 1. In other words, the logical block addresses of the host 10 are grouped into a plurality of groups, and the mapping table MT is divided into a plurality of sub mapping tables SMT_1 to SMT_n according to the groups. The logical block addresses of the sub mapping tables SMT_1 to SMT_n are not overlapping one another, and the corresponding physical block addresses (PBA) are not overlapping one another either. After the logical block addresses are grouped according to step S220, the corresponding logical block addresses in each of the sub mapping tables may be fixed, whereas the corresponding physical block addresses are dynamically assigned. All the free blocks which are not yet assigned in the non-volatile storage circuit 130 are placed into a free block pool. When one specific sub mapping table requires use of additional non-volatile storage blocks (physical blocks), the controller 110 may request for one free block from the free block pool to be provided to the specific sub mapping table. Said operation of requesting for one free block from the free block pool may be performed by assigning based on a wear-leveling measure.

Each of the logical block address groups (or the sub mapping tables SMT_1 to SMT_n) is assigned one group read-count value. For example, a first logical block address group (or the sub mapping table SMT_1) is assigned one group read-count value $RC\_1$, a second logical block address group (or the sub mapping table SMT_2) is assigned one group read-count value $RC\_2$ and an n-th logical block address group (or the sub mapping table SMT_n) is assigned one group read-count value $RC\_n$. Initial values of the group read-count values $RC\_1$ to $RC\_n$ may be decided according to design requirements. For instance, in some embodiments, the initial values of the group read-count values $RC\_1$ to $RC\_n$ may be −15, 0, 10 or other real numbers. Each of the group read-count values $RC\_1$ to $RC\_n$ represents the number of times data is read from respectively one of the logical block address groups (or the sub mapping tables SMT_1 to SMT_n). The controller 110 may trigger an adjustment of the group read-count values $RC\_1$ to $RC\_n$ according to the "read" command of the host 10 (step S230).

In some embodiments, after the controller 110 receive the "read" command of the host 10, the controller 110 converts a target logical block address of the "read" command into a target physical block address according to the mapping table MT of the main memory 120, and accesses the non-volatile storage block (physical block) addressed by the target physical block address in the non-volatile storage circuit 130 according to the "read" command. After a data read operation is completed for the non-volatile storage block (physical block), the controller 110 may increase a read-count value corresponding to the target logical block address of the group read-count values $RC\_1$ to $RC\_n$ by one step value in step S230. The step value may be decided according design requirements. For instance, the step value may be 1 or other real numbers.

For instance, in the case where the logical block address of the "read" command sent by the host 10 belongs to the n-th logical block address group (or the sub mapping table SMT_n), the controller 110 may convert the target logical block address of the "read" command into the target physical block address according to the sub mapping table SMT_n of the main memory 120, and accesses the non-volatile storage block (physical block) addressed by the target physical block address in the non-volatile storage circuit 130 according to the "read" command. After the data read operation is completed for the non-volatile storage block (physical block), the controller 110 may increase the group read-count value $RC\_n$ corresponding to the target logical block address by one step value.

In step S240, the controller 110 may check whether the group read-count values $RC\_1$ to $RC\_n$ exceed a preset range. The preset range may be decided according to design requirements. If none of the group read-count values $RC\_1$ to $RC\_n$ exceeds the preset range, the controller 110 may return to step S230 to wait for the next "read" command sent by the host 10. When one read-count value of the group read-count values $RC\_1$ to $RC\_n$ exceeds the preset range, the controller 110 may proceed to step S250 in order to perform a scan operation to the non-volatile storage block corresponding to the logical block addresses of a corresponding logical block address group corresponding to the read-count value, so as to check the number of error bits. For instance (but not limited thereto), the controller 110 may compare the group read-count values $RC\_1$ to $RC\_n$ with one threshold, so as to determine a relation between the group read-count values RC_1 to RC_n and the preset range in step S240. The threshold may be decided according to design requirements. In the case where the controller 110 found that the group read-count value RC_1 of the first logical block address group (or the sub mapping table SMT_1) is greater than the threshold, the controller 110 may perform the scan operation to one or more non-volatile storage blocks (the physical blocks of the non-volatile storage circuit 130) corresponding to the logical block addresses of the first logical block address group (or the sub mapping table SMT_1) corresponding to the group read-count value RC_1, so as to check the number of error bits.

The implementation of step S230 and step S240 should not be limited by the above. For example, in some other embodiments, after the controller 110 receive the "read" command of the host 10, the controller 110 converts the target logical block address of the "read" command into the target physical block address according to the mapping table MT of the main memory 120, and accesses the non-volatile storage block (physical block) addressed by the target physical block address in the non-volatile storage circuit 130 according to the "read" command. After the data read operation is completed for the non-volatile storage block (physical block), the controller 110 may decrease the read-count value corresponding to the target logical block address of the group read-count values RC_1 to RC_n by one step value in step S230. For instance, in the case where the logical block address of the "read" command sent by the host 10 belongs to the n-th logical block address group (or the sub mapping table SMT_n), the controller 110 may convert the target logical block address of the "read" command into the target physical block address according to the sub mapping table SMT_n of the main memory 120, and accesses the non-volatile storage block (physical block) addressed by the target physical block address in the non-volatile storage circuit 130 according to the "read" command. After the data read operation is completed for the non-volatile storage block (physical block), the controller 110 may decrease the group read-count value RC_n corresponding to the target logical block address by one step value. In step S240, the controller 110 may compare the group read-count values RC_1 to RC_n with one threshold, so as to determine a relation between the group read-count values RC_1 to RC_n and the preset range. The threshold may be decided according to design requirements. In the case where the controller 110 found that the group read-count value RC_1 of the first logical block address group (or the sub mapping table SMT_1) is less than the threshold, the controller 110 may perform the scan operation to one or more non-volatile storage blocks (the physical blocks of the non-volatile storage circuit 130) corresponding to the logical block addresses of the first logical block address group (or the sub mapping table SMT_1) corresponding to the group read-count value RC_1 (step S250), so as to check the number of error bits.

The controller 110 may further decide whether to perform a storage block data-moving operation to the one or more non-volatile storage blocks corresponding to the logical block addresses of the corresponding logical block address group based on results of the scan operation in step S250. For instance, it is assumed the results of the scan operation indicate that one non-volatile storage block (one specific physical block of the non-volatile storage circuit 130, which is referred to as a suspect storage block hereinafter) corresponding to the first logical block address group (the sub mapping table SMT_1) corresponding to the group read-count value RC_1 has the excessive number of error bits. Accordingly, the controller 110 may perform the storage block data-moving operation to the suspect storage block corresponding to the first logical block address group (the sub mapping table SMT_1) in step S250. The controller 110 may move data of the suspect storage block to one spare storage block (i.e., one free block requested from the free block pool), and the controller 110 may reset the group read-count value RC_1 corresponding to the suspect storage block to the initial value. The initial value may be decided according to design requirements. For instance, the initial value may be 0 or other real numbers. After the data of the suspect storage block is moved to the spare storage block, the sub mapping table SMT_1 is updated in order to replace the suspect storage block by the spare storage block and release the suspect storage block back to the free block pool.

As such, the non-volatile memory apparatus 100 and the operating method thereof as described in the present embodiment are capable of recording the group read-count values RC_1 to RC_n corresponding to the logical block address groups (or the sub mapping tables SMT_1 to SMT_n) respectively. The group read-count values RC_1 to RC_n may represent the number of times the read operation is performed for these logical block address groups. In the situation where the read operation is performed to one physical block for a long period of time (multiple times), the number of errors bits in that physical block increases with increases in usage time (the read-count). The controller 110 may flexibly decide the timing for the scan operation according to the group read-count values RC_1 to RC_n, so as to timely check the number of error bits in the corresponding storage block (physical block). Based on the results of the scan operation, the controller may dynamically decide whether to perform the storage block data-moving operation in order to prevent data loss for the storage block (physical block).

Figure 3:
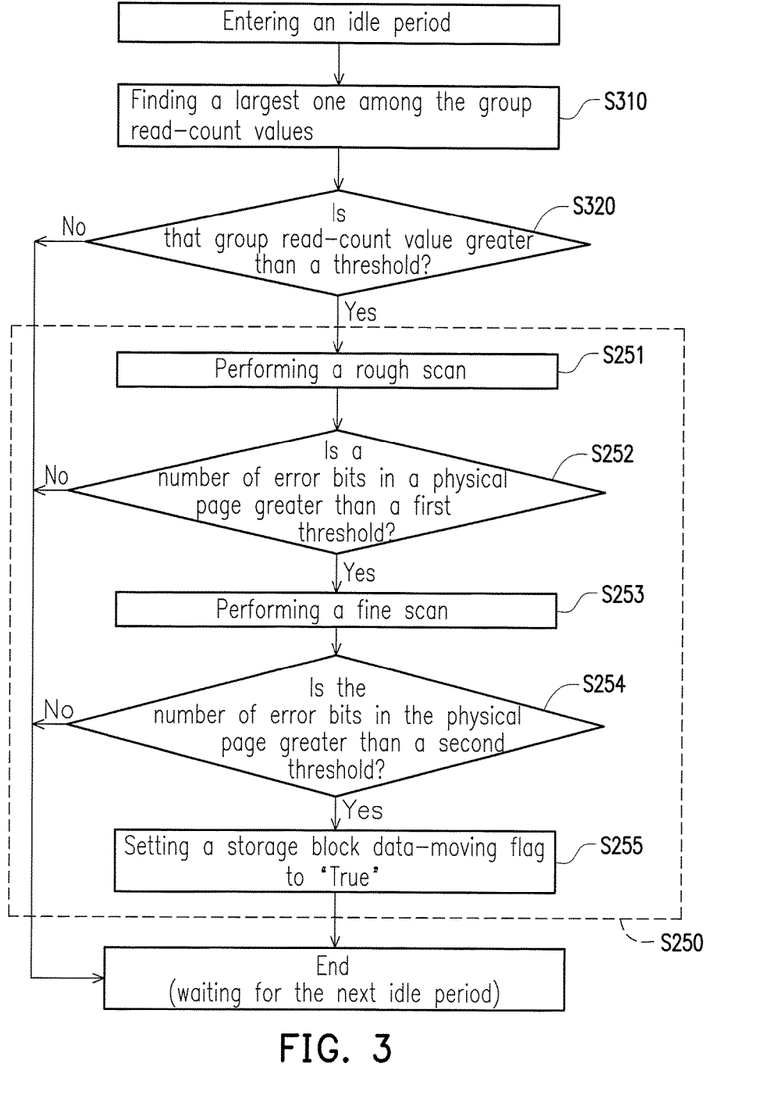
FIG. 3 is a schematic diagram illustrating an operating method of the non-volatile memory apparatus depicted in FIG. 1 according to another embodiment of the invention.

FIG. 3 is a schematic diagram illustrating an operating method of the non-volatile memory apparatus 100 depicted in FIG. 1 according to another embodiment of the invention. In general, after the current command of the host 10 is processed by the controller 110, the controller 110 enters an idle period to wait for the next command of the host 10. Referring to FIG. 1 and FIG. 3, after entering the idle period, the controller 110 may proceed to step S310, so as to find a largest one from among the group read-count values RC_1 to RC_n of the logical block address groups (or the sub mapping tables SMT_1 to SMT_n). In step S320, the controller 110 may check whether the largest read-count value found in step S310 exceeds the threshold. The threshold may be decided according to design requirements. When the largest read-count value found in step S310 does not exceed the threshold, the process in FIG. 3 is ended (to wait for the next idle period). When the largest read-count value found in step S310 exceeds the threshold, it means that data of one or more non-volatile storage blocks (the physical blocks of the non-volatile storage circuit 130) corresponding to the largest read-count value is read multiple times. The data stored in the physical block being read multiple times implies that this physical block may have the excessive number of error bits. Therefore, the controller 110 may proceed to step S250, so as to perform the scan operation to the non-volatile storage blocks (the physical blocks of the non-volatile storage circuit 130) corresponding to one corresponding logical block address group corresponding to the largest read-count value found in step S310. The scan operation may further confirm the number of error bits in the non-volatile storage blocks (the physical blocks of the non-volatile storage circuit 130). Step S320 and step S250 depicted in FIG. 3 may be deduced by analogy with reference to related description of step S240 and step S250 depicted in FIG. 2.

In the embodiment of FIG. 3, the scan operation described in step S250 includes sub steps S251 to S255. In step S251, the controller 110 may perform a rough scan to the non-volatile storage blocks (the physical blocks of the non-volatile storage circuit 130) corresponding to the corresponding logical block address group (i.e., a group corresponding to the largest read-count value found in step S310). In step S252, the controller 110 may learn whether the number of error bits in the physical page is greater than a first threshold. The first threshold may be decided according to design requirements. For instance (but not limited thereto), in the case where the largest read-count value found in step S310 is the group read-count value RC_1, the controller 110 may select one physical page from the non-volatile storage blocks (the physical blocks of the non-volatile storage circuit 130) corresponding to the first logical block address group (or the sub mapping table SMT_1) randomly (or according to one specific rule) in step S251 and check the number of error bits in the selected physical page. When the number of error bits in the selected physical page is less than the first threshold, the process of FIG. 3 is ended (to wait for the next idle period). When the number of error bits in the selected physical page is greater than the first threshold, it means that the non-volatile storage block (the physical block of the non-volatile storage circuit 130) to which the selected physical page belongs is the suspect storage block, and thus the controller 110 may proceed to step S253 in order to perform a fine scan.

The controller 110 may decide whether to perform the fine scan to one suspect storage block of the non-volatile storage blocks corresponding to the corresponding logical block address group based on a result of the rough scan. In step S253, the controller 110 may perform the fine scan to the suspect storage block (or check all physical pages of the suspect storage block). In an embodiment, the controller 110 may perform the fine scan only to valid physical pages of the suspect storage block. A corresponding relation between addresses of the valid physical page and the logical addresses may be recorded into a table. That is to say, each of the addresses of the valid physical page of the memory may be corresponding to one specific logical address. For instance, the addresses of the valid physical page of the suspect storage block may be obtained by using a look-up table before performing the fine scan to the valid physical page. In step S254, the controller 110 may learn whether the number of error bits in the physical page is greater than a second threshold according to a result of the fine scan. The second threshold may be decided according to design requirements. For instance (but not limited thereto), it is assumed that the largest read-count value found in step S310 is the group read-count value RC_2, and the number of error bits in one physical page of the physical block corresponding to the group read-count value RC_2 is greater than the first threshold (satisfies steps S252 and S253). When it is determined that the number of error bits in each of all the physical pages of the suspect storage block is less than the second threshold in step S254, the process of FIG. 3 is ended (to wait for the next idle period). At the time, the group read-count value RC_2 is not reset yet. The controller 110 may decide whether to perform the storage block data-moving operation to the suspect storage block based on the result of the fine scan, so as to move data of the suspect storage block to the spare storage block. When it is determined that the number of error bits in one physical page of the suspect storage block is greater than the second threshold in step S254, it means that this suspect storage block has the excessive number of error bits. Accordingly, the controller 110 may proceed to step S255 in order to prepare for performing the storage block data-moving operation and resetting the group read-count value corresponding to the suspect storage block to the initial value.

Figure 4:
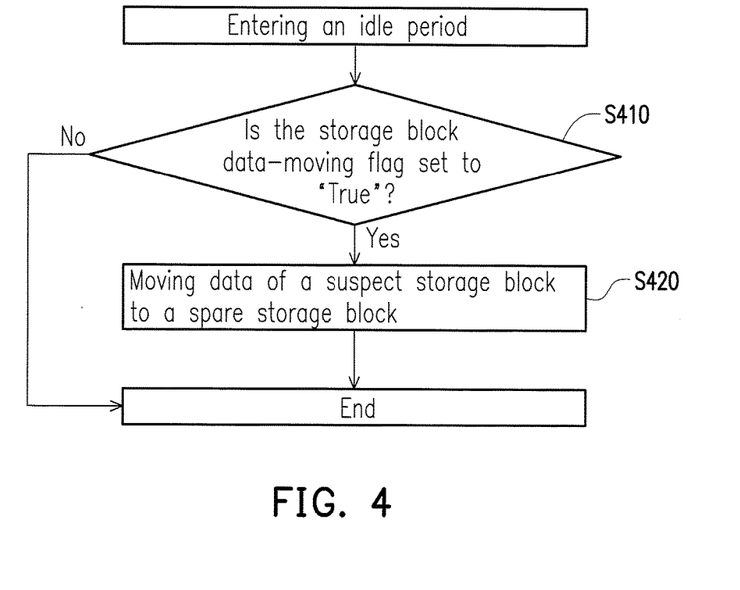
FIG. 4 is a schematic diagram illustrating the operating method of the storage block data-moving operation according to an embodiment of the invention.

Generally, the idle period is very short. To prevent an operating efficiency of the non-volatile memory apparatus 100 from being influenced, step S255 sets a value of "a storage block data-moving flag" of the suspect storage block to "True" (e.g., logic value 1) rather than actually performs the storage block data-moving operation to the suspect storage block. After step S255 is completed, the process of FIG. 3 is ended (to wait for the next idle period). FIG. 4 is a schematic diagram illustrating the operating method of the storage block data-moving operation according to an embodiment of the invention. Referring to FIG. 1 and FIG. 4, after entering the idle period, the controller 110 may proceed to step S410, so as to check "the storage block data-moving flags" of all the physical blocks (non-volatile storage blocks) of the non-volatile storage circuit 130. When the controller 110 determines that the values of "the storage block data-moving flags" of all the physical blocks of the non-volatile storage circuit 130 are not "True" in step S410, the process of FIG. 4 is ended (to wait for the next idle period). When the controller 110 determines that the value of "the storage block data-moving flag" of one physical block (the non-volatile storage block, also known as the suspect storage block herein) is "True" in step S410, the controller 110 may proceed to step S420, so as to move the data of the suspect storage block to the spare storage block. After the data of the suspect storage block is moved to the spare storage block, the suspect storage block is replaced by the spare storage block, and the suspect storage block is released back to the free block pool. After step S420 is completed, the process of FIG. 4 is ended (to wait for the next idle period).

Figure 5:
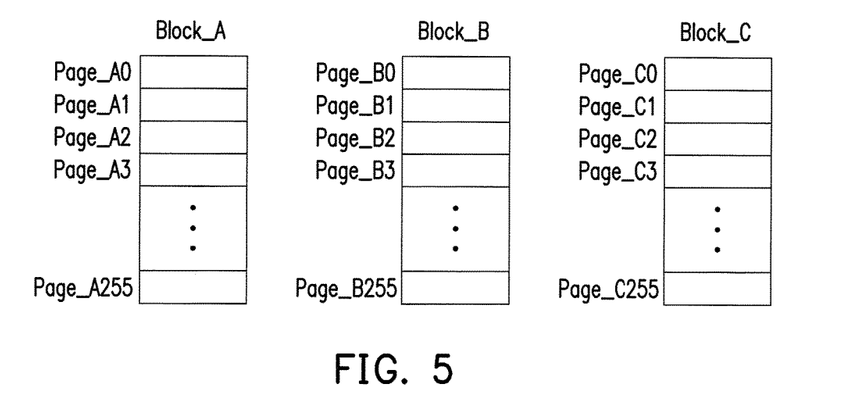
FIG. 5 is a schematic diagram illustrating a part of the non-volatile storage blocks (physical blocks) of the non-volatile storage circuit depicted in FIG. 1 according to an embodiment of the invention.

FIG. 5 is a schematic diagram illustrating a part of the non-volatile storage blocks (physical blocks) of the non-volatile storage circuit 130 depicted in FIG. 1 according to an embodiment of the invention. Herein, it is assumed that the group read-count value RC_1 exceeds the preset range (e.g., greater than the threshold), as determined in step S240 depicted in FIG. 2 (or step S320 depicted in FIG. 3). Accordingly, the non-volatile storage blocks (physical blocks) Block_A, Block_B and Block_C corresponding to the first logical block address group (or the sub mapping table SMT_1) of the group read-count value RC_1 are illustrated in FIG. 5. Although FIG. 5 illustrates only three non-volatile storage blocks Block_A, Block_B and Block_C, but a number of the non-volatile storage blocks corresponding to one logical block address group may be two, four or more in other embodiments. For instance, the non-volatile storage block Block_A has physical pages Page_A0, Page_A1, Page_A2, Page_A3, . . . , Page_A255; the non-volatile storage block Block_B has physical pages Page_B0, Page_B1, Page_B2, Page_B3, . . . , Page_B255; and the non-volatile storage block Block_C has physical pages Page_C0, Page_C1, Page_C2, Page_C3, . . . , Page_C255.

Referring to FIG. 1, FIG. 3 and FIG. 5, in some embodiments, the rough scan in step S251 may include the following operations. The controller 110 may use one page pointer in step S251. The page pointer may point to one physical page of one storage block of the non-volatile storage blocks Block_A, Block_B and Block_C corresponding to the corresponding logical block address group of the group read-count value RC_1. For example, the page pointer may point to one physical page Page_A0 of the non-volatile storage block Block_A. In step S251, the controller 110 may check the number of error bits in the physical page Page_A0 pointed by the page pointer. When the number of error bits in the physical page Page_A0 pointed by the page pointer is less than the first threshold, the controller 110 may change the page pointer to point to a physical page of another storage block of the non-volatile storage blocks Block_A, Block_B and Block_C (e.g., one physical page Page_B0 of the non-volatile storage block Block_B) corresponding to the corresponding logical block address group of the group read-count value RC_1. The controller 110 may check the number of error bits in the physical page Page_B0 pointed by the page pointer. When the number of error bits in the physical page Page_B0 pointed by the page pointer is less than the first threshold, the controller 110 may change the page pointer to point to a physical page of another storage block of the non-volatile storage blocks Block_A, Block_B and Block_C (e.g., one physical page Page_C0 of the non-volatile storage block Block_C) corresponding to the corresponding logical block address group of the group read-count value RC_1. The controller 110 may check the number of error bits in the physical page Page_C0 pointed by the page pointer. When the number of error bits in the physical page Page_C0 pointed by the page pointer is less than the first threshold, the controller 110 may change the page pointer to point to a physical page of another storage block of the non-volatile storage blocks Block_A, Block_B and Block_C (e.g., one physical page Page_A1 of the non-volatile storage block Block_A) corresponding to the corresponding logical block address group of the group read-count value RC_1. In the current idle period, when the number of error bits in each of the physical pages Page_A0, Page_B0 and Page_C0 is less than the first threshold, a determination result of step S252 is "No" and thus the process of FIG. 3 is ended (to wait for the next idle period). By analogy, after entering the next idle period, the controller 110 may continue to check the number of error bits in the physical pages Page_A1, Page_B1 and Page_C1. When the number of error bits in each of the physical pages Page_A1, Page_B1 and Page_C1 is less than the first threshold, the determination result of step S252 is "No" and thus the process of FIG. 3 is ended (to wait for the next idle period again). By analogy, the rough scan is completed when all the physical pages of the non-volatile storage blocks Block_A, Block_B and Block_C corresponding to the corresponding logical block address group of the group read-count value RC_1 are checked and the number of error bits in each of all the physical pages in the non-volatile storage blocks Block_A, Block_B and Block_C is less than the first threshold. When the rough scan is completed for all the physical pages in the non-volatile storage blocks Block_A, Block_B and Block_C corresponding to the corresponding logical block address group of the group read-count value RC_1 (i.e., when the number of error bits in each of all the physical pages of the non-volatile storage blocks Block_A, Block_B and Block_C is less than the first threshold), the controller 110 may reset the group read-count value RC_1 to the initial value.

During the rough scan, when it is found that the number of error bits in one physical page of the non-volatile storage blocks Block_A, Block_B and Block_C corresponding to the corresponding logical block address group of the group read-count value RC_1 is greater than the first threshold (i.e., the determination result of step S252 is "Yes"), the controller 110 may perform the fine scan to the suspect storage block to which that physical page belongs (step S253). For instance, when the number of error bits in the physical page Page_A1 pointed by the page pointer is greater than the first threshold, the controller 110 may perform the fine scan to the storage block Block_A to which the physical page Page_A1 belongs.

The implementation of the rough scan described in step S251 should not be limited by the above. For instance, in some other embodiments, the rough scan in step S251 may include the following operations. The controller 110 may use one page pointer in step S251. The page pointer may point to one physical page of one storage block of the non-volatile storage blocks Block_A, Block_B and Block_C corresponding to the corresponding logical block address group of the group read-count value RC_1. For example, the page pointer may point to one physical page Page_B1 of the non-volatile storage block Block_B. In step S251, the controller 110 may check the number of error bits in the physical page Page_B1 pointed by the page pointer and at least one adjacent physical page. The at least one adjacent physical page is one or more other physical pages adjacent to the physical page Page_B1 pointed by the page pointer. Based on design requirements, when the page pointer points to the physical page Page_B1, the at least one adjacent physical page may include the physical page Page_B0, the physical page Page_B2, the physical page Page_B3 and/or other physical pages. For instance, when the page pointer points to the physical page Page_B1, the at least one adjacent physical page may include the physical page Page_B0 and the physical page Page_B2. When the number of error bits in the physical page Page_B1 pointed by the page pointer and the at least one adjacent physical page (e.g., Page_B0 and Page_B2) is less than the first threshold, the controller 110 may change the page pointer to point to a physical page of another storage block of the non-volatile storage blocks Block_A, Block_B and Block_C (e.g., one physical page Page_C1 of the non-volatile storage block Block_C) corresponding to the corresponding logical block address group of the group read-count value RC_1. The controller 110 may check the number of error bits in the physical page Page_C1 pointed by the page pointer and at least one adjacent physical page (e.g., Page_C0 and Page_C2). When the number of error bits in the physical page Page_C1 pointed by the page pointer and the at least one adjacent physical page (e.g., Page_C0 and Page_C2) is less than the first threshold, the controller 110 may change the page pointer to point to a physical page of another storage block of the non-volatile storage blocks Block_A, Block_B and Block_C (e.g., one physical page Page_A2 of the non-volatile storage block Block_A) corresponding to the corresponding logical block address group of the group read-count value RC_1. The controller 110 may check the number of error bits in the physical page Page_A2 pointed by the page pointer and at least one adjacent physical page (e.g., Page_A1 and Page_A3). When the number of error bits in the physical page Page_A2 pointed by the page pointer and the at least one adjacent physical page (e.g., Page_A1 and Page_A3) is less than the first threshold, the controller 110 may change the page pointer to point to a physical page of another storage block of the non-volatile storage blocks Block_A, Block_B and Block_C (e.g., one physical page Page_B2 of the non-volatile storage block Block_B) corresponding to the corresponding logical block address group of the group read-count value RC_1. By analogy, the rough scan is completed when all the physical pages of the non-volatile storage blocks Block_A, Block_B and Block_C corresponding to the corresponding logical block address group of the group read-count value RC_1 are checked and the number of error bits in each of all the physical pages in the non-volatile storage blocks Block_A, Block_B and Block_C is less than the first threshold. When the rough scan is completed for all the physical pages in the non-volatile storage blocks Block_A, Block_B and Block_C corresponding to the corresponding logical block address group of the group read-count value RC_1, the controller 110 may reset the group read-count value RC_1 to the initial value. During the rough scan, the controller 110 may perform the fine scan to the suspect storage block to which the physical page pointed by the page pointer belongs when the number of error bits in the physical page pointed by the page pointer and the at least one adjacent physical page is greater than the first threshold (step S253).

In some embodiments, the rough scan in step S251 may also include the following operations. The page pointer may point to the physical pages (these physical page may be adjacent or not adjacent to each other) of the non-volatile storage block according to a look-up table, and said look-up table defines the physical pages of the non-volatile storage block that require the rough scan. In an embodiment, the look-up table may define a plurality of physical pages of at least one non-volatile storage block, and may also define a plurality of physical pages of a plurality of non-volatile storage blocks. For instance, the controller 110 may sequentially check the number of error bits in the physical pages of the non-volatile storage block Block_A according to a look-up table Table1 (not illustrated). According to the look-up table Table1, when the number of error bits in each of the physical pages of the non-volatile storage block Block_A pointed by the page pointer is less than the first threshold, the controller 110 may change the page pointer to point to the physical pages of the non-volatile storage block Block_B corresponding to the corresponding logical block address group of the group read-count value RC_1. By analogy, the rough scan is completed when the number of error bits in each of all the physical pages of the non-volatile storage blocks Block_A, Block_B and Block_C is less than the first threshold. In another embodiment, each of the non-volatile storage blocks may also include its own look-up table that is used to define the physical pages of each of the non-volatile storage blocks that require the rough scan. For instance, the controller 110 may sequentially check the number of error bits in the physical pages of the non-volatile storage block Block_B according a look-up Table2 (not illustrated), and the controller 110 may sequentially check the number of error bits in the physical pages of the non-volatile storage block Block_C according a look-up Table3 (not illustrated).

The fine scan described in step S253 may include the following operations. The controller 110 may check all the physical pages Page_A0 to Page_A255 of the storage block Block_A to which the physical block Page_A1 pointed by the page pointer belongs in step S253, so as to obtain the number of error bits in valid data of the physical pages Page_A0 to Page_A255. When the number of error bits in the valid data of each of the physical pages Page_A0 to Page_A255 of the storage block Block_A to which the physical block Page_A1 pointed by the page pointer belongs is less than the second threshold, a determination result of step S254 is "No" and thus the process of FIG. 3 is ended (to wait for the next idle period). When the number of error bits in the valid data of one physical page (e.g., the physical page Page_A3) of all the physical pages Page_A0 to Page_A255 of the storage block Block_A to which the physical block Page_A1 pointed by the page pointer belongs is greater than the second threshold, the controller 110 may perform "the storage block data-moving operation" to the storage block Block_A pointed by the page pointer (step S255) to move data of the storage block Block_A to the spare storage block. After "the storage block data-moving operation" is completed, the controller 110 may reset the group read-count value RC_1 corresponding to the corresponding logical block address group (or the sub mapping table SMT_1) to the initial value.

The implementation of "the scan operation" described in the present application should not be limited by the description of FIG. 3. For example, in some other embodiments, "the scan operation" may include the following operations. Herein, it is assumed that the group read-count value RC_1 exceeds the preset range (e.g., greater than the threshold). Accordingly, the non-volatile storage blocks (physical blocks) Block_A, Block_B and Block_C corresponding to the first logical block address group (or the sub mapping table SMT_1) corresponding to the group read-count value RC_1 are illustrated in FIG. 5. Because the group read-count value RC_1 is greater than the threshold, "the scan operation" is performed to the non-volatile storage blocks (physical blocks) Block_A, Block_B and Block_C corresponding to the first logical block address group (or the sub mapping table SMT_1). Referring to FIG. 1 and FIG. 5, the controller 110 may use one page pointer. The page pointer points to a physical page of one storage block of the non-volatile storage blocks corresponding to the corresponding logical block address group (the first logical block address group or the sub mapping table SMT_1). For example, the page pointer may point to one physical page Page_A0 of the non-volatile storage block Block_A. The controller 110 may check the number of error bits in the physical page Page_A0 pointed by the page pointer. When the number of error bits in the physical page Page_A0 pointed by the page pointer is less than the first threshold, the controller 110 may change the page pointer to point to a physical page of another storage block of the non-volatile storage blocks Block_A, Block_B and Block_C (e.g., one physical page Page_B0 of the non-volatile storage block Block_B). The controller 110 may check the number of error bits in the physical page Page_B0 pointed by the page pointer. When the number of error bits in the physical page Page_B0 pointed by the page pointer is less than the first threshold, the controller 110 may change the page pointer to point to a physical page of another storage block of the non-volatile storage blocks Block_A, Block_B and Block_C (e.g., one physical page Page_C0 of the non-volatile storage block Block_C). The controller 110 may check the number of error bits in the physical page Page_C0 pointed by the page pointer. When the number of error bits in the physical page Page_C0 pointed by the page pointer is less than the first threshold, the controller 110 may change the page pointer to point to a physical page of another storage block of the non-volatile storage blocks Block_A, Block_B and Block_C (e.g., one physical page Page_A1 of the non-volatile storage block Block_A). By analogy, when the scan operation is completed for all the physical pages of the non-volatile storage blocks Block_A, Block_B and Block_C corresponding to the corresponding logical block address group (the first logical block address group or the sub mapping table SMT_1) (i.e., when the number of error bits in each of all the physical pages of the non-volatile storage blocks Block_A, Block_B and Block_C is less than the first threshold), the controller 110 may reset the group read-count value RC_1 corresponding to the corresponding logical block address group (the first logical block address group or the sub mapping table SMT_1) to the initial value. When the number of error bits in the physical page (e.g., the physical page Page_C0) pointed by the page pointer is greater than the threshold, the controller 110 may perform "the storage block data-moving operation" to the storage block (e.g., the storage block Block_C) to which the physical page belongs, so as to move the data of the storage block to the spare storage block. In an embodiment, when the data of the storage block (e.g., the storage block Block_C) to which the physical page belongs is moved, the group read-count value RC_1 corresponding to the storage block (e.g., the storage block Block_C) is reset to the initial value.

In still some other embodiments, "the scan operation" may include the following operations. Herein, it is assumed that the group read-count value RC_1 exceeds the preset range (e.g., greater than the threshold). Accordingly, the non-volatile storage blocks (physical blocks) Block_A, Block_B and Block_C corresponding to the first logical block address group (or the sub mapping table SMT_1) corresponding to the group read-count value RC_1 are illustrated in FIG. 5. Because the group read-count value RC_1 is greater than the threshold, "the scan operation" is performed to the non-volatile storage blocks (physical blocks) Block_A, Block_B and Block_C corresponding to the first logical block address group (or the sub mapping table SMT_1). Referring to FIG. 1 and FIG. 5, the controller 110 may use one block pointer. The block pointer points to one storage block of the non-volatile storage blocks corresponding to the corresponding logical block address group (the first logical block address group or the sub mapping table SMT_1). For example, the block pointer may point to one storage block Block_A of the non-volatile storage blocks (physical blocks) Block_A, Block_B and Block_C. The controller 110 may check the number of error bits in all physical pages of the storage block Block_A pointed by the block pointer. When the number of error bits in the storage block Block_A pointed by the block pointer is less than the threshold, the controller 110 may change the block pointer to point to another storage block (e.g., the storage block Block_B) of the non-volatile storage blocks Block_A, Block_B and Block_C. The controller 110 may check the number of error bits in all physical pages of the storage block Block_B pointed by the block pointer. When the number of error bits in the storage block Block_B pointed by the block pointer is less than the threshold, the controller 110 may change the block pointer to point to another storage block (e.g., the storage block Block_C) of the non-volatile storage blocks Block_A, Block_B and Block_C. The controller 110 may check the number of error bits in all physical pages of the storage block Block_C pointed by the block pointer. When the number of error bits in the storage block Block_C pointed by the block pointer is less than the threshold, the controller 110 may change the block pointer to point to another storage block (e.g., the storage block Block_A) of the non-volatile storage blocks Block_A, Block_B and Block_C.

When the scan operation is completed for all the non-volatile storage blocks Block_A, Block_B and Block_C corresponding to the corresponding logical block address group (the first logical block address group or the sub mapping table SMT_1) (i.e., when the number of error bits in each of the non-volatile storage blocks Block_A, Block_B and Block_C is less than the threshold), the controller 110 may reset the group read-count value RC_1 corresponding to the corresponding logical block address group (the first logical block address group or the sub mapping table SMT_1) to the initial value. When the number of error bits in the non-volatile storage block (e.g., the non-volatile storage block Block_C) pointed by the block pointer is greater than the threshold, the controller 110 may perform "the storage block data-moving operation" to the non-volatile storage block Block_C pointed by the block pointer to move data of the non-volatile storage block Block_C to the spare storage block. In an embodiment, after the data of the non-volatile storage block (e.g., the non-volatile storage block Block_C) is moved, the group read-count value RC_1 corresponding to the non-volatile storage block (e.g., the non-volatile storage block Block_C) is reset to the initial value.

In some other embodiments, after the data read operation is completed for one specific physical block, the controller 110 may "decrease" the read-count value corresponding to the specific physical block of the group read-count values RC_1 to RC_n by one step value. Therefore, in some other embodiments, one or more steps depicted in FIG. 3 may be changed correspondingly. For example, after entering the idle period, the controller 110 may find "a smallest one" from among the group read-count values RC_1 to RC_n of the logical block address groups (or the sub mapping tables SMT_1 to SMT_n) in step S310. In step S320, the controller 110 may check whether "the smallest read-count value" found in step S310 is "less than" the threshold. The threshold may be decided according to design requirements. When "the smallest read-count value" found in step S310 is not "less than" the threshold, the process in FIG. 3 is ended (to wait for the next idle period). When "the smallest read-count value" found in step S310 is "less than" the threshold, it means that data of one or more non-volatile storage blocks (the physical blocks of the non-volatile storage circuit 130) corresponding to "the smallest read-count value" is read multiple times. Therefore, the controller 110 may proceed to step S250, so as to perform the scan operation to the non-volatile storage blocks (the physical blocks of the non-volatile storage circuit 130) corresponding to one corresponding logical block address group corresponding to "the smallest read-count value" found in step S310.

It should be noted that, under different application scenarios, related functions of the controller 110 and/or the main memory 120 may be implemented in form of software, firmware or hardware by utilizing common programming languages (e.g., C or C++), hardware description languages (e.g., Verilog HDL or VHDL) or other suitable programming languages. The software (or the firmware) capable of executing the related functions can be arranged into any known computer-accessible media such as magnetic tapes, semiconductor memories, magnetic disks or compact disks (e.g., CD-ROM or DVD-ROM); or the software (or the firmware) may be transmitted via the Internet, a wired communication, a wireless communication or other communication mediums. Said software (or the firmware) may be stored in the computer-accessible media for a computer processor to access/execute programming codes of the software (or the firmware). In addition, the device and the method of the invention can also be implemented by a combination of software and hardware.

In summary, the non-volatile memory apparatus 100 and the operating method thereof as described in various embodiments of the invention are capable of recording the group read-count values RC_1 to RC_n corresponding to the logical block address groups (or the sub mapping tables SMT_1 to SMT_n) respectively. The group read-count values RC_1 to RC_n may represent the number of times the read operation is performed for these logical block address groups. In the situation where the read operation is performed to one physical block for a long period of time (multiple times), the number of errors bits in that physical block increases with increases in usage time (the read-count). The controller 110 of the non-volatile memory apparatus 100 may flexibly decide the timing for the scan operation according to the group read-count values RC_1 to RC_n, so as to timely check the number of error bits in part of the storage blocks (physical blocks) of the non-volatile storage circuit 130. Since "the scan operation" does not target all the storage blocks of the non-volatile storage circuit 130, the operating efficiency of the non-volatile memory apparatus 100 may be prevented from being influenced. Based on the results of the scan operation, the controller may dynamically decide whether to perform the storage block data-moving operation in order to prevent data loss for the storage block (physical block).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A non-volatile memory apparatus, comprising:
   a non-volatile storage circuit, comprising a plurality of non-volatile storage blocks addressed by a plurality of physical block addresses;
   a main memory, configured to store a mapping table, wherein the mapping table is configured to record a conversion relation between a plurality of logical block addresses and the physical block addresses; and
   a controller, coupled to the main memory and the non-volatile storage circuit, wherein the controller groups the logical block addresses into a plurality of logical block address groups; each of the logical block address groups includes a plurality of logical block addresses, each of the logical block address groups is assigned one group read-count value; an adjustment of the group read-count values is triggered by a read command of a host; when one read-count value of the group read-count values exceeds a preset range, the controller performs a scan operation to the non-volatile storage blocks corresponding to the logical block addresses of a corresponding logical block address group corresponding to the read-count value, so as to check a number of error bits; and the controller decides whether to perform a storage block data-moving operation to one storage block of the non-volatile storage blocks corresponding to the logical block addresses of the corresponding logical block address group based on results of the scan operation, wherein the scan operation comprises:
   performing a rough scan to the non-volatile storage blocks corresponding to the corresponding logical block address group by the controller;
   deciding whether to perform a fine scan to one suspect storage block of the non-volatile storage blocks corresponding to the corresponding logical block address group by the controller based on a result of the rough scan, wherein the result of the rough scan identifies that one suspect storage block; and
   deciding whether to perform the storage block data-moving operation to the suspect storage block by the controller based on a result of the fine scan performed to the suspect storage block, so as to move data of the suspect storage block to a spare storage block.

2. The non-volatile memory apparatus of claim 1, wherein after the controller receive the read command of the host, the controller converts a target logical block address of the read command into a target physical block address according to the mapping table, accesses a non-volatile storage block addressed by the target physical block address according to the read command and increases a read-count value of the group read-count values corresponding to the target logical block address by a step value.

3. The non-volatile memory apparatus of claim 1, wherein after the controller receive the read command of the host, the controller converts a target logical block address of the read command into a target physical block address according to the mapping table, accesses a non-volatile storage block addressed by the target physical block address according to the read command and decreases a read-count value of the group read-count values corresponding to the target logical block address by a step value.

4. The non-volatile memory apparatus of claim 1, wherein the controller compares the group read-count values with a threshold, so as to determine a relation between the group read-count values and the preset range; and when one read-count value of the group read-count values is greater than the threshold, the controller performs the scan operation to the non-volatile storage blocks corresponding to the logical block addresses of the corresponding logical block address group corresponding to the read-count value, so as to check the number of error bits.

5. The non-volatile memory apparatus of claim 1, wherein the controller compares the group read-count values with a threshold, so as to determine a relation between the group read-count values and the preset range; and when one read-count value of the group read-count values is less than the threshold, the controller performs the scan operation to the non-volatile storage blocks corresponding to the logical block addresses of the corresponding logical block address group corresponding to the read-count value, so as to check the number of error bits.

6. The non-volatile memory apparatus of claim 1, wherein the rough scan comprises:
   pointing to a physical page of one storage block of the non-volatile storage blocks corresponding to the corresponding logical block address group by a page pointer;
   checking, by the controller, the number of error bits in the physical page pointed by the page pointer and at least one adjacent physical page; and
   changing the page pointer to point to a physical page of another storage block of the non-volatile storage blocks corresponding to the corresponding logical block address group by the controller when the number of error bits in the physical page pointed by the page pointer and the at least one adjacent physical page is less than a first threshold.

7. The non-volatile memory apparatus of claim 6, wherein the controller performs the fine scan to the storage block which the physical page belongs when the number of error bits in the physical page pointed by the page pointer and the at least one adjacent physical page is greater than the first threshold.

8. The non-volatile memory apparatus of claim 1, wherein the rough scan comprises:

pointing to a physical page of one storage block of the non-volatile storage blocks corresponding to the corresponding logical block address group by a page pointer;

checking, by the controller, the number of error bits in the physical page pointed by the page pointer; and changing the page pointer to point to a physical page of another storage block of the non-volatile storage blocks corresponding to the corresponding logical block address group by the controller when the number of error bits in the physical page pointed by the page pointer is less than a first threshold.

9. The non-volatile memory apparatus of claim 8, wherein the controller performs the fine scan to the storage block which the physical page belongs when the number of error bits in the physical page pointed by the page pointer is greater than the first threshold.

10. The non-volatile memory apparatus of claim 1, wherein the controller resets the read-count value corresponding to the corresponding logical block address group to an initial value when the rough scan is completed for all physical pages of the non-volatile storage blocks corresponding to the corresponding logical block address group.

11. The non-volatile memory apparatus of claim 1, wherein the fine scan comprises:

pointing to a physical page of one storage block of the non-volatile storage blocks corresponding to the corresponding logical block address group by a page pointer;

checking, by the controller, the number of error bits in each of valid physical pages of the storage block which the physical page pointed by the page pointer belongs; and not resetting the read-count value corresponding to the corresponding logical block address group by the controller when the number of error bits in each of the valid physical pages of the storage block corresponding to the page pointer is less than a second threshold.

12. The non-volatile memory apparatus of claim 1, wherein the fine scan comprises:

pointing to a physical page of one storage block of the non-volatile storage blocks corresponding to the corresponding logical block address group by a page pointer;

checking, by the controller, the number of error bits in each of all physical pages of the storage block which the physical page pointed by the page pointer belongs; and not resetting the read-count value corresponding to the corresponding logical block address group by the controller when the number of error bits in each of all the physical pages of the storage block corresponding to the page pointer is less than a second threshold.

13. The non-volatile memory apparatus of claim 1, wherein when the number of error bits in one physical page of the suspect storage block is greater than a second threshold, the controller performs the storage block data-moving operation to the suspect storage block to move the data of the suspect storage block to the spare storage block, and the controller resets the read-count value corresponding to the corresponding logical block address group to the initial value.

14. A non-volatile memory apparatus, comprising:

a non-volatile storage circuit, comprising a plurality of non-volatile storage blocks addressed by a plurality of physical block addresses;

a main memory, configured to store a mapping table, wherein the mapping table is configured to record a conversion relation between a plurality of logical block addresses and the physical block addresses; and a controller, coupled to the main memory and the non-volatile storage circuit, wherein the controller groups the logical block addresses into a plurality of logical block address groups; each of the logical block address groups includes a plurality of logical block addresses, each of the logical block address groups is assigned one group read-count value; an adjustment of the group read-count values is triggered by a read command of a host; when one read-count value of the group read-count values exceeds a preset range, the controller performs a scan operation to the non-volatile storage blocks corresponding to the logical block addresses of a corresponding logical block address group corresponding to the read-count value, so as to check a number of error bits; and the controller decides whether to perform a storage block data-moving operation to one storage block of the non-volatile storage blocks corresponding to the logical block addresses of the corresponding logical block address group based on results of the scan operation, wherein the scan operation comprises:

pointing to a physical page of one storage block of the non-volatile storage blocks corresponding to the corresponding logical block address group by a page pointer;

checking, by the controller, the number of error bits in the physical page pointed by the page pointer; and changing the page pointer to point to a physical page of another storage block of the non-volatile storage blocks corresponding to the corresponding logical block address group by the controller when the number of error bits in the physical page pointed by the page pointer is less than a threshold.

15. The non-volatile memory apparatus of claim 14, wherein the controller resets the read-count value corresponding to the corresponding logical block address group to an initial value when the scan operation is completed for all physical pages of the non-volatile storage blocks corresponding to the corresponding logical block address group.

16. The non-volatile memory apparatus of claim 14, wherein the controller performs the storage block data-moving operation to the storage block which the physical page belongs to move data of the storage block to a spare storage block when the number of error bits in the physical page pointed by the page pointer is greater than the threshold.

17. An operating method of a non-volatile memory apparatus, comprising:

configuring a non-volatile storage circuit, wherein the non-volatile storage circuit comprises a plurality of non-volatile storage blocks addressed by a plurality of physical block addresses;

configuring a main memory for storing a mapping table, wherein the mapping table is configured to record a conversion relation between a plurality of logical block addresses and the physical block addresses;

grouping the logical block addresses into a plurality of logical block address groups by a controller, wherein each of the logical block address groups includes a plurality of logical block addresses, each of the logical block address groups is assigned one group read-count value;

triggering an adjustment of the group read-count values according to a read command of a host;

when one read-count value of the group read-count values exceeds a preset range, performing a scan operation to the non-volatile storage blocks corresponding to the logical block addresses of a corresponding logical block address group corresponding to the read-count value by the controller, so as to check a number of error bits; and deciding whether to perform a storage block data-moving operation to one storage block of the non-volatile storage blocks corresponding to the logical block addresses of the corresponding logical block address group by the controller based on results of the scan operation, wherein the scan operation comprises:

performing a rough scan to the non-volatile storage blocks corresponding to the corresponding logical block address group by the controller;

deciding whether to perform a fine scan to one suspect storage block of the non-volatile storage blocks corresponding to the corresponding logical block address group by the controller based on a result of the rough scan, wherein the result of the rough scan identifies that one suspect storage block; and deciding whether to perform the storage block data-moving operation to the suspect storage block by the controller based on a result of the fine scan performed to the suspect storage block, so as to move data of the suspect storage block to a spare storage block.

18. The operating method of the non-volatile memory apparatus of claim 17, wherein the step of triggering the adjustment of the group read-count values according to the read command of the host comprises:

converting, by the controller, a target logical block address of the read command into a target physical block address according to the mapping table, accessing a non-volatile storage block addressed by the target physical block address according to the read command and increasing a read-count value of the group read-count values corresponding to the target logical block address by a step value after the controller receive the read command of the host.

19. The operating method of the non-volatile memory apparatus of claim 17, wherein the step of triggering the adjustment of the group read-count values according to the read command of the host comprises:

converting, by the controller, a target logical block address of the read command into a target physical block address according to the mapping table, accessing a non-volatile storage block addressed by the target physical block address according to the read command and decreasing a read-count value of the group read-count values corresponding to the target logical block address by a step value after the controller receive the read command of the host.

20. The operating method of the non-volatile memory apparatus of claim 17, further comprising:

comparing the group read-count values with a threshold by the controller, so as to determine a relation between the group read-count values and the preset range; and when one read-count value of the group read-count values is greater than the threshold, performing the scan operation to the non-volatile storage blocks corresponding to the logical block addresses of the corresponding logical block address group corresponding to the read-count value by the controller, so as to check the number of error bits.

21. The operating method of the non-volatile memory apparatus of claim 17, further comprising:

comparing the group read-count values with a threshold by the controller, so as to determine a relation between the group read-count values and the preset range; and when one read-count value of the group read-count values is less than the threshold, performing the scan operation to the non-volatile storage blocks corresponding to the logical block addresses of the corresponding logical block address group corresponding to the read-count value by the controller, so as to check the number of error bits.

22. The operating method of the non-volatile memory apparatus of claim 17, wherein the rough scan comprises:

pointing to a physical page of one storage block of the non-volatile storage blocks corresponding to the corresponding logical block address group by a page pointer;

checking, by the controller, the number of error bits in the physical page pointed by the page pointer and at least one adjacent physical page; and changing the page pointer to point to a physical page of another storage block of the non-volatile storage blocks corresponding to the corresponding logical block address group by the controller when the number of error bits in the physical page pointed by the page pointer and the at least one adjacent physical page is less than a first threshold.

23. The operating method of the non-volatile memory apparatus of claim 22, wherein when the number of error bits in the physical page pointed by the page pointer and the at least one adjacent physical page is greater than the first threshold, performing the fine scan to the storage block which the physical page belongs by the controller.

24. The operating method of the non-volatile memory apparatus of claim 17, wherein the rough scan comprises:

pointing to a physical page of one storage block of the non-volatile storage blocks corresponding to the corresponding logical block address group by a page pointer;

checking, by the controller, the number of error bits in the physical page pointed by the page pointer; and changing the page pointer to point to a physical page of another storage block of the non-volatile storage blocks corresponding to the corresponding logical block address group by the controller when the number of error bits in the physical page pointed by the page pointer is less than a first threshold.

25. The operating method of the non-volatile memory apparatus of claim 24, wherein when the number of error bits in the physical page pointed by the page pointer is greater than the first threshold, performing the fine scan to the storage block which the physical page belongs by the controller.

26. The operating method of the non-volatile memory apparatus of claim 17, wherein when the rough scan is completed for all physical pages of the non-volatile storage blocks corresponding to the corresponding logical block address group, resetting the read-count value corresponding to the corresponding logical block address group to an initial value by the controller.

27. The operating method of the non-volatile memory apparatus of claim 17, wherein the fine scan comprises:

pointing to a physical page of one storage block of the non-volatile storage blocks corresponding to the corresponding logical block address group by a page pointer;

checking, by the controller, the number of error bits in each of valid physical pages of the storage block which the physical page pointed by the page pointer belongs; and not resetting the read-count value corresponding to the corresponding logical block address group by the controller when the number of error bits in each of the valid physical pages of the storage block corresponding to the page pointer is less than a second threshold.

28. The operating method of the non-volatile memory apparatus of claim 17, wherein the fine scan comprises:

pointing to a physical page of one storage block of the non-volatile storage blocks corresponding to the corresponding logical block address group by a page pointer;

checking, by the controller, the number of error bits in each of all physical pages of the storage block which the physical page pointed by the page pointer belongs; and not resetting the read-count value corresponding to the corresponding logical block address group by the controller when the number of error bits in each of all the physical pages of the storage block corresponding to the page pointer is less than a second threshold.

29. The operating method of the non-volatile memory apparatus of claim 17, wherein when the number of error bits in one physical page of the suspect storage block is greater than a second threshold, performing the storage block data-moving operation to the suspect storage block to move the data of the suspect storage block to the spare storage block by the controller, and resetting the read-count value corresponding to the corresponding logical block address group to the initial value by the controller.

30. An operating method of a non-volatile memory apparatus, comprising:

configuring a non-volatile storage circuit, wherein the non-volatile storage circuit comprises a plurality of non-volatile storage blocks addressed by a plurality of physical block addresses;

configuring a main memory for storing a mapping table, wherein the mapping table is configured to record a conversion relation between a plurality of logical block addresses and the physical block addresses;

grouping the logical block addresses into a plurality of logical block address groups by a controller, wherein each of the logical block address groups includes a plurality of logical block addresses, each of the logical block address groups is assigned one group read-count value;

triggering an adjustment of the group read-count values according to a read command of a host;

when one read-count value of the group read-count values exceeds a preset range, performing a scan operation to the non-volatile storage blocks corresponding to the logical block addresses of a corresponding logical block address group corresponding to the read-count value by the controller, so as to check a number of error bits; and deciding whether to perform a storage block data-moving operation to one storage block of the non-volatile storage blocks corresponding to the logical block addresses of the corresponding logical block address group by the controller based on results of the scan operation, wherein the scan operation comprises:

pointing to a physical page of one storage block of the non-volatile storage blocks corresponding to the corresponding logical block address group by a page pointer;

checking, by the controller, the number of error bits in the physical page pointed by the page pointer; and changing the page pointer to point to a physical page of another storage block of the non-volatile storage blocks corresponding to the corresponding logical block address group by the controller when the number of error bits in the physical page pointed by the page pointer is less than a threshold.

31. The operating method of the non-volatile memory apparatus of claim 30, wherein when the scan operation is completed for all physical pages of the non-volatile storage blocks corresponding to the corresponding logical block address group, resetting the read-count value corresponding to the corresponding logical block address group to an initial value by the controller.

32. The operating method of the non-volatile memory apparatus of claim 30, wherein when the number of error bits in the physical page pointed by the page pointer is greater than the threshold, performing the storage block data-moving operation to the storage block which the physical page belongs by the controller to move data of the storage block to a spare storage block.

* * * * *